3,122,567
ORGANO-MANGANESE COMPOUNDS AND REACTIONS
Harold H. Zeiss and Minoru Tsutsui, Dayton, Ohio, assignors to Monsanto Chemical Company, St. Louis, Mo., a corporation of Delaware
No Drawing. Filed June 17, 1960, Ser. No. 36,733
6 Claims. (Cl. 260—346.1)

The present invention is directed to the cyclization of organic compounds containing unsaturated triple carbon-to-carbon bonds in the presence of covalent manganese, particularly di-covalent, hydrocarbon manganese compounds. The invention is also directed to bis-arene-$\pi$-complexes of manganese (I), and methods for the preparation thereof.

In one aspect the invention concerns the cyclic condensation of di-hydrocarbon substituted non-alpha alkynes (i.e. alkynes other than 1-alkynes) to hexa-substituted benzenes.

In another aspect, the invention concerns the preparation of bis-arene-$\pi$-complexes of manganese (I), and involves the cyclic condensation of di-hydrocarbon substituted acetylenes on di-covalently bonded hydrocarbon manganese compounds.

In still another aspect the invention is directed to the process of reacting together manganese halide, magnesium, an organic halide capable of forming a Grignard reagent, and an acetylene containing no acidic hydrogen to obtain hexa-substituted arenes and bis-arene-$\pi$-complexes of manganese (I).

The invention is further directed to di-hydrocarbon substituted, di-covalent manganese compounds solvated with tetrahydrofuran, the same being useful as intermediates in the preparation of the bis-arene-$\pi$-complexes of manganese (I).

A further object of this invention is to prepare covalent, di-hydrocarbon substituted manganese compounds in stable form.

Another object of this invention is to provide an efficient method of synthesis of substituted benzenes from di-organo substituted acetylenes.

SYNTHESIS OF BIS-ARENE-$\pi$-COMPLEXES OF MANGANESE (I) AND HEXA-SUBSTITUTED BENZENES

EQUATION 1

(Step I) $RX + Mg \xrightarrow{(THF)} RMgX$ (Step II) $RMgX + MnCl_2 \xrightarrow{(THF)} R_2Mn(THF)_n$ (Step III) $R_2Mn(THF)_n + R'-C\equiv C-R' \xrightarrow{Ether}$

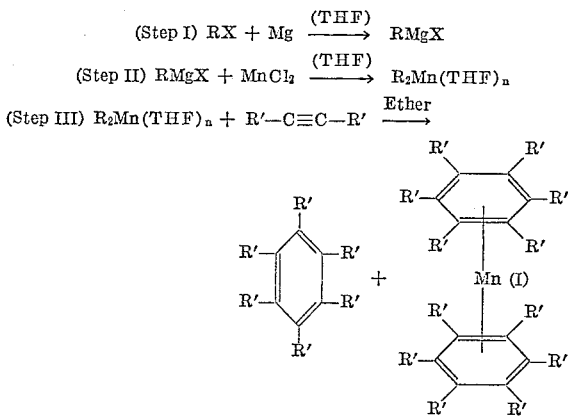

where

R = monovalent hydrocarbon radical,
X = Grignard halogen, $n$ = moles of THF (complexed) in the solvate,
THF = tetrahydrofuran,
R' = a monovalent hydrocarbon radical.

In the above equation the R' substituents on both acetylene carbon atoms are quite often the same, but the R' substituent on one acetylenic carbon atom can be different from that on the other acetylenic carbon atom. The above reactions although being shown as taking place in stepwise fashion can also be considered as taking place in situ.

The process according to one of the aspects of the invention is capable of converting any hydrocarbon halogen compound, capable of forming a Grignard reagent in the normal manner, into di-hydrocarbon, di-covalently bonded manganese compounds containing covalent carbon to manganese bonds. As examples of suitable aryl compounds suitable for use in forming such Grignard reagents the following can be named; phenylbromide; 1,4-dibromobenzene; 1,2-dibromobenzene; p-bromotoluene; p-iodotoluene; p-bromostyrene; p-bromo-$\alpha$-methylstyrene; bromomesitylene; phenylchloride; $\alpha$-bromo-naphthalene; $\beta$-bromo-naphthalene; $\alpha$-bromoanthracene; $\beta$-bromophenanthrene; p-diethylaminobromobenzene; m-bromotoluene; o-bromotoluene; 1-bromo-4-chlorobenzene; $\alpha$-bromotetralin; pentamethylbromobenzene; m-fluorobromobenzene; p-ethylbromobenzene; p-butylbromobenzene; p-isobutylbromobenzene; p-sec-butylbromobenzene; p-t-butylbromobenzene p-hexylbromobenzene; p-phenylbromobenzene, etc. As will be apparent from the above listed exemplary compounds, the method of this aspect of the present invention is applicable to halogenated aryl hydrocarbon and to other aryl halogen compounds as long as these compounds do not contain either active hydrogen atoms, unsaturated carbon-to-oxygen bonds, or other functional groups capable of destroying or reacting with Grignard reagents.

As suitable aliphatic halogen compounds the following are listed as exemplary of compounds from which Grignard reagents can be prepared, and which in turn are useful in preparing aliphatic di-covalent manganese compounds; methyl chloride; ethyl chloride; ethyl bromide; propyl chloride; isopropyl chloride; allyl chloride; t-butyl chloride; pentyl bromide; hexyl chloride; octyl chloride, etc. As to the monovalent alkyl hydrocarbon radicals attached to metal by carbon-to-metal bonding, those straight or branched-chain alkyl radicals containing about 1 to 20 carbon atoms will ordinarily be employed, particularly those in the range of 1 to 10 or so carbon atoms for example, methyl, ethyl, n-propyl, isopropyl, n-butyl, isobutyl, sec-butyl, tertiary-butyl, n-pentyl (and each of its isomers), n-hexyl, n-heptyl, n-octyl, 2-ethylhexyl, nonyl, decyl, dodecyl, tridecyl (from Oxo process), octadecyl, eicosyl, etc. Cycloalkyl halogen compounds may also be employed to prepare Grignard reagents (which when reacted with the manganous halide as shown in step II of the reaction, lead to the formation of di-cycloalkyl substituted di-covalent manganese compounds). As exemplary of suitable cycloalkyl radicals, cyclopentyl, cyclohexyl, etc. can most conveniently be employed. It is also possible to utilize unsaturated cycloaliphatics, e.g., cyclopentadienyl. The straight chain aliphatics can also be unsaturated, e.g., vinyl, propenyl, allyl, etc. groups being suitable.

For an acetylene to condense to an aromatic compound according to the present invention it is necessary that it be di-substituted. Any alkynes, other than 1-alkynes, are suitable for such purpose, for example, non-alpha-alkynes of 4 to 20 or more carbon atoms, particularly the non-alpha-alkynes of 4 to 10 carbon atoms. Suitable alkynes are, for example, those di-substituted acetylenes in which the substituents are any of the straight or forked chain alkyl radicals named hereinabove with respect to suitable alkyl radicals attached to the manganese in the di-covalent manganese compounds (which are prepared as shown in step II of Equation 1); and, in fact, aryl and cycloalkyl substituents are also suitable, and any of the aryl or cycloalkyl radicals named in connection with the manganese compounds above (with respect to the formation of their Grignard reagent "precursors") are also suitable substituents for the di-substituted acetylenes. Moreover, acetylenes substituted by heterocyclic substituents are also suitable and produce hexa-substituted benzenes containing heterocyclic substituents. As specific examples of non-alpha-alkynes and other di-substituted acetylenes suitable for conversion to substituted benzenes, the following can be named; 2-butyne; 2-pentyne; 2-hexyne; 3-hexyne; 2-octyne; 3-octyne; 2,2-dimethyl-3-hexyne; 2-methyl-3-heptyne; 5-decyne; 4-dodecyne; 6-hexadecyne; 2-eicosyne; dicarbethoxy acetylene; diphenyl acetylene; α-phenyl-β-methyl acetylene; α-phenylmethyl-β-methyl acetylene; di-α-naphthyl acetylene; 1-anthracyl-propyne; p-tolylethylpropyne; di-p-tolylacetylene; α-xylyl-β-methylacetylene; etc. Various other hydrocarbon substituents can be employed as long as they do not possess reactive groups which would interfere with π-complex formation and cyclized condensation to substituted benzenes.

The reaction in step II produces a di-covalently bonded, di-hydrocarbon substituted manganese solvate. Where the solvating agent is tetrahydrofuran, an extremely stable solvate is formed. The term "solvated" as employed herein is intended to designate molecular bonding or association of a type similar but not necessarily identical to that involved in hydrates of chemical compounds. When tetrahydrofuran is used as the solvating agent, the "$R_2Mn(THF)_n$" solvate formed is so stable that in order to react the solvate with the di-hydrocarbon substituted acetylene, "$R'$—C≡C—$R'''$" compound, it becomes necessary to decompose the tetrahydrofuranate. This can be accomplished by addition of a major amount of diethyl ether to the tetrahydrofuran solvated compound. If desired the synthesis of both the bis-arene-π-complexes of manganese (I) and the hexa-substituted benzenes can be accelerated by the use of diethyl ether as the solvating agent for the reactions of Equation 1. The di-covalently bound, di-hydrocarbon substituted manganese ether solvated complex is more reactive to the non-alpha alkynes added in step III.

Where the hydrocarbon "R" substituents are aryl in nature, in order for the di-covalently bonded, di-hydrocarbon substituted manganese solvate to react with the non-alpha alkyne thus (A) participating in the formation of the π-complexes and (B) assisting the cyclized condensation of the selected non-alpha alkyne to the corresponding hexasubstituted benzene; the aryl groups must not possess bulky ortho substituents. Such ortho substituted "aryl type" compounds are stable towards non-alpha alkynes and will not react therewith. The probable reason for their inoperativeness in step III of Equation 1 is the existence of steric hinderance which precludes their participation in the reaction. The presence of two ortho substituents on the aryl group, each being ortho to the ring carbon atom which is covalently bonded to manganese, creates extreme stability and consequent non-reactivity even in the case of alkyl groups such as methyl groups. For example dimesityl manganese solvates will not participate in the reaction indicated in step III of Equation 1. These ortho substituted "aryl type" hydrocarbon manganese solvates can be reductively cleaved with a strong reducing agent, e.g., lithium aluminum hydride, to yield two moles of the ortho substituted aryl hydrocarbon, and thus constitute a stable source of such hydrocarbons. In this respect they can be regarded as useful chemical intermediates.

Thus in order for the dicovalently bonded, dihydrocarbon substituted manganese solvates, e.g. the $R_2Mn(THF)_n$ of Equation 1, to participate in the reaction of step III; each ring carbon atom which is ortho to the carbon atom covalently bonded to manganese must be bonded to an atom which is small in size, e.g. hydrogen, fluorine, etc. Those atoms of a size greater than hydrogen may be used as long as their size is less than that of the methyl group. It is preferred that the ortho positions be occupied by hydrogen atoms. This limitation concerning the ortho substituents is present, of course, only in the case of "aryl type" hydrocarbon "R" groups, and does not affect "alkyl type" "R" groups.

The importance and value of our invention is apparent from the fact that it provides new synthesis of aromatic molecules. Acetylenes are, of course, an old and well known class of chemicals and extensive work has been carried out in an effort to find useful condensations of acetylenes. The present discovery now provides a procedure for condensing acetylenes under mild, controlled conditions to obtain specific, identifiable hexa-substituted benzenes. In addition the procedure, as outlined by Equation 1, allows preparation of bis-arene-π-complexes of manganese (I). In this respect this constitutes an important advance in the organo-metallic field because bis-arene-π-complexes of manganese (I) have been previously unattainable either from Friedel-Crafts type reactions or by direct synthesis from Grignard reagents and manganese halides. It will therefore be apparent that the present invention involves a novel reaction rather than specific conditions for carrying out such reactions. However, the following conditions will ordinarily be observed. The mole ratio of di-hydrocarbon substituted, di-covalently bound manganese compound to acetylenic di-hydrocarbon substituted compound will generally be in the range of about 1:1 or 1:20 or even higher, but it is generally advisable to have at least 3 moles of acetylenic compound present if the maximum utilization of the di-covalent, di-hydrocarbon substituted manganese compound is to be effected. The condensation reactions, as depicted in step III, can be carried out generally at temperatures varying from about —50° C. to +70° C., or to about the boiling point of the solvating agent employed, depending to some extent on the reactivity of the reactants chosen, and can conveniently be effected by mixing the reactants at lower temperatures and completing the reaction at higher temperatures; temperatures of the order of 10° to 30° C. or so or approximately room temperature can conveniently be employed. The reactions can take from a few minutes to several hours; but, in order to insure complete reaction and maximum yields, the reaction mixture can be permitted to stand several days. The reaction is conducted under usual Grignard conditions as understood by those skilled in the art with exclusion of oxygen, moisture, etc.

One especially notable aspect of our invention is the fact that it is possible to react the reagents utilized in preparing the di-covalent, di-hydrocarbon substituted manganese solvate, including even the magnesium turnings, simultaneously in the same reaction vessel with the di-hydrocarbon substituted acetylenic compound, and obtain the hexa-substituted benzene compounds and bis-arene-π-complexes of manganese (I) as products substantially as though the various steps of the reaction were conducted separately. Therefore the synthesis can be conducted either in stepwise fashion or as an overall in situ type synthesis.

It will be observed that in the case of the di-covalently bound, di-hydrocarbon substituted manganese compound, the "R" portions of this compound are derived from the monovalent hydrocarbon radical of the "RMgX" Grignard reagent. It is also apparent that in the case of both the bis-arene-π-complexes of manganese (I) and the hexa-hydrocarbon substituted benzenes, the "R'" substituents are derived from the di-hydrocarbon substituted acetylenic compounds.

While the exact reason why the cyclic condensation occurs is not exactly understood, it appears that the condensation is catalytic. The catalyst may be the di-covalently bound, di-hydrocarbon substituted manganese compound or the bis-arene-π-complexes of manganese (I), or both of them as occurring in the same reaction mixture.

It will be observed that whether the synthesis is run in situ, or in step-wise fashion, the di-covalent manganese compound and the bis-arene-π-complexes are present in the same reaction mixture. The invention is not dependent upon this or any other theory of reaction however.

An exemplary reaction, utilizing phenylmagnesium bromide (as an example of an organic Grignard reagent); manganous chloride (as an example of a di-valent manganese compound), and 2-butyne (as an example of a suitable non-alpha alkyne) is depicted by Equation 2.

EQUATION 2

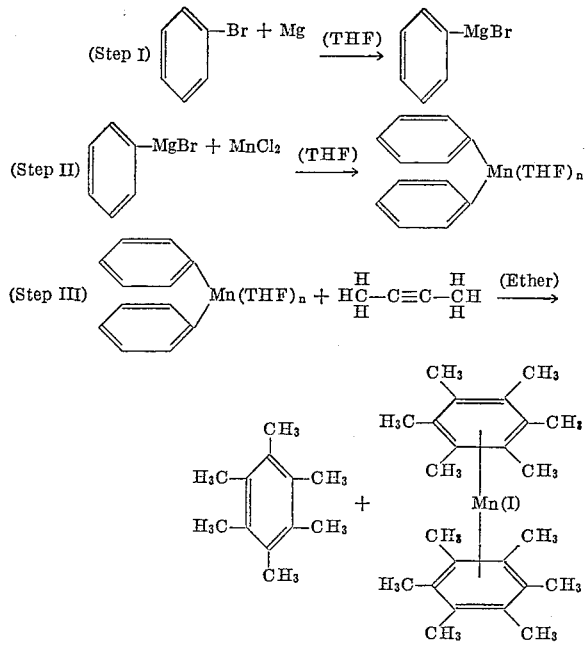

The bis-arene-π-complexes of manganese (I), e.g. the bis(hexamethylbenzene)-manganese (I) as produced during the cyclic condensation, are readily isolated in the form of their halide, picrate, reineckate, and tetraphenylboron salts. This isolation procedure will be shown schematically for bis(hexamethylbenzene)-manganese (I) using an aqueous solution of tetraphenylboron salt.

EQUATION 3

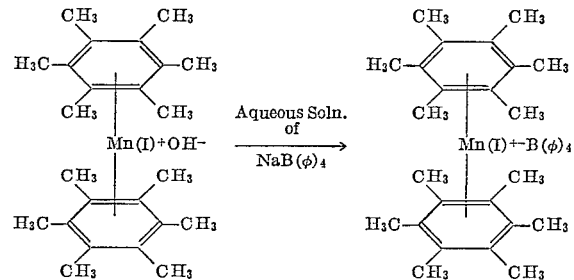

Thus in the exemplary isolation procedure as depicted by Equation 3 the bis(hexamethylbenzene)-manganese (I) tetraphenyl boron salt is formed. This bis(arene)π-complex salt, or "sandwich type" complex salt was, upon magnetic measurement, shown to be diamagnetic. This behavior is illustrated by Equation 4:

EQUATION 4.—(DIAGRAMMATIC PROPERTIES OF BIS-(HEXAMETHYLBENZENE)-MANGANESE (I) SALT)

$$X \frac{293° K.}{mol.} = (-307) \cdot (10^{-6}) \text{ c.g.s. } \mu$$

The infrared absorption of the bis(hexamethylbenzene)-manganese (I) tetraphenyl boron salt, when compared to that of bis(hexamethylbenzene)-chromium (I) tetraphenyl boron salt, was quite similar. Upon reductive cleavage of the tetraphenyl boron salt with a reductive cleaving agent, e.g. lithium aluminum hydride, hexamethylbenzene was recovered in almost quantitative amounts.

These latter procedures confirm the existence of the π-complex of manganese (I). As will be apparent, the reductive cleavage of the bis(hexa-hydrocarbon substituted benzene) manganese (I) π-complex offers a new method of attaining hexa-substituted benzenes.

The invention will be further illustrated by the examples which follow.

*Example 1*

To a slurried solution of manganous chloride (2.52 g., 0.02 mole) in 75 ml. of ether, 29 ml. of phenyl magnesium bromide-ether solution (1.38 molar concentration, 0.04 mol.) was added drop-wise. The temperature of the reaction mixture was kept at −50° C. during the addition of Grignard reagent. The temperature was then raised to −20° C. and the solution stirred for about ½ hour until no more white solid precipitated. 2-butyne (6.48 g., 0.012 mol.) was added to the reaction mixture, while the temperature thereof was kept below 20° C. The temperature was gradually raised to room temperature over a period of 4 hours after the addition of 2-butyne. The mixture was stirred over night, the black colored reaction mixture was then hydrolyzed with 50 ml. of water. The mixture was further diluted with 300 ml. of ether and 200 ml. of water. The ether extract and the water extract (the water extract being brownish in color) were then separated. The brownish aqueous layer was put aside for later treatment. Removal of ether from the ether extract left an oily material, hexamethylbenzene, which gave a deep-orance picrate when it was reacted with picric acid salt solution. The hexamethylbenzene picrate was recrystalized from methanol to give a melting point of 173° to 175° C. The yield of hexamethylbenzene picrate was 2 g., and thus constituted a 31.4% yield. The mixed melting point of the hexamethylbenzene picrate, as compared with an authentic sample of hexamethylbenzene picrate, showed no depression, and their infrared spectra were superimposable.

The addition of a sodium tetraphenyl boron water solution to the brown water solution, mentioned above, precipitated pinkish-white solid material. Reprecipitation of this material from methylethyl ketone solution by the addition of petroleum ether (B.P. 30° C. to 60° C.) yielded pinkish-white crystals of bis(hexamethylbenzene)-manganese (I) tetraphenylboron salt. The weight of this π-complex tetraphenyl boron salt was 2.5 g., and thus constituted a yield of 10.8%. The π-complex gradually decomposed upon heating to 350° C.

Analytical calculation for $C_{48}H_{56}MnB$: C, 82.51; H, 8.08; Mn, 7.86; B, 1.55. Found: C, 82.64, H, 7.82; Mn, 8.16; B, 1.52.

*Example 2*

2 moles of phenylmagnesium bromide and 1 mole of manganous chloride were mixed in tetrahydrofuran to yield a light greenish-yellow compound, diphenylmanganese, which precipitated from the reaction mixture. 2-butyne was then added at room temperature, but no reaction ensued. Then twice the amount of di-ethyl ether, as compared to tetrahydrofuran was added to the tetrahydrofuran solvate and resulted in the cyclization reaction with 2-butyne. This cyclic condensation proceeded smoothly yielding hexamethylbenzene and the π-complex, bis(hexamethylbenzene)-manganese (I). The hexamethylbenzene was present in a yield of 10%, and the π-complex was recovered in 4% yield. The analysis of the π-complex, isolated in the form of its tetraphenyl boron salt, agreed well with that of bis(hexamethylbenzene)-manganese (I) tetraphenyl boron salt as analyzed in Example 1.

Although the two preceding examples describe the isolation of the π-complex in the form of its tetraphenylboron salt, it should be understood that it can also be isolated in the forms of its halide, reineckate, and picrate salts.

Generally it is sufficient, in so far as the production of the hexa-substituted benzenes are concerned, to carry the synthesis procedure to the step III stage of Equations 1 and 2. However, it is possible to convert the bis(hexahydrocarbon substituted benzene)-manganese (I) compound to the corresponding hexa-substituted benzenes by reductive cleavage of the $\pi$-complex with a suitable cleaving agent such as lithium aluminum hydride. Thus the synthesis may also be viewed as giving predominantly hexa-substituted benzenes by carrying the reaction past the "step III" stage and reductively cleaving the $\pi$-complex. Also the manganese compound left from the reductive cleaving can be reacted with a halogen acid, e.g. hydrochloric acid, to yield manganous chloride. The manganous chloride can then, if desired, be recycled back for use in step II of the reactions depicted by Equations 1 and 2.

The substituted benzenes produced by the present invention are in general known compounds or homologues of same having recognized value and can be used for various purposes as set forth in the copending application of one of us and another, Serial No. 738,953, filed June 2, 1958, and issued as Patent No. 2,953,610 on September 20, 1960.

We claim:

1. Di-arylmanganese solvated with tetrahydrofuran, the aryl radicals being monocyclic hydrocarbon.
2. Di-mesitylmanganese solvated with tetrahydrofuran.
3. The method of preparing di-mesitylmanganese tetrahydrofuranate which comprises reacting mesitylmagnesium bromide with manganous chloride in the presence of tetrahydrofuran.
4. The method of preparing hexaalkyl benzenes and bis(hexaalkylbenzene) $\pi$-complexes of manganese I which comprises reacting an organo magnesium halide Grignard reagent selected from the group consisting of alkyl magnesium halides and phenyl magnesium halides, manganous halide and dialkyl acetylenes of 4 to 20 carbon atoms.
5. The method of condensing certain acetylenes to hexaalkyl benzenes which comprises reacting di-covalent, dihydrocarbon manganese in which the hydrocarbon groups are selected from the group consisting of alkyl and phenyl with dialkyl acetylenes of 4 to 20 carbon atoms in diethyl ether to obtain the said hexaalkyl benzenes.
6. The method of preparing hexaalkyl benzenes which comprises reacting di-covalent, dihydrocarbon manganese in which the hydrocarbon groups are selected from the group consisting of alkyl and phenyl with dialkyl acetylenes of 4 to 20 carbon atoms in diethyl ether to yield hexaalkyl benzenes and bis-(hexaalkylbenzene) $\pi$-complexes of manganese (I), and reductively cleaving the so produced bis-(hexaalkylbenzene) $\pi$-complexes of manganese I with lithiumaluminum hydride to yield hexaalkyl benzenes.

References Cited in the file of this patent

UNITED STATES PATENTS

| | | |
|---|---|---|
| 2,952,522 | Podall | Sept. 13, 1960 |
| 2,953,586 | Hafner | Sept. 20, 1960 |
| 2,980,741 | Zeiss et al. | Apr. 18, 1961 |

FOREIGN PATENTS

| | | |
|---|---|---|
| 218,942 | Australia | Nov. 26, 1958 |
| 1,214,952 | France | Nov. 16, 1959 |

OTHER REFERENCES

"Chem. of Organometallic Compounds" (Rochow), pub. by J. Wiley and Sons, Inc. (N.Y.), 1957 (pp. 240–243 relied on).